United States Patent [19]
Canales

[11] Patent Number: 5,505,565
[45] Date of Patent: Apr. 9, 1996

[54] APPARATUS FOR MAKING UP THREADED PIPE JOINTS INTO A PIPELINE

[76] Inventor: Joe M. Canales, P.O. Box 6, Benavides, Tex. 78341

[21] Appl. No.: 266,251

[22] Filed: Jun. 27, 1994

Related U.S. Application Data

[63] Continuation-in-part of Ser. No. 14,851, Feb. 8, 1993, Pat. No. 5,354,150.

[51] Int. Cl.⁶ ..................................................... F16L 1/00
[52] U.S. Cl. ........................ 405/303; 166/77.51; 405/158; 405/169; 405/154
[58] Field of Search ................................. 405/154, 156, 405/184, 188, 169, 170, 171, 303, 174; 294/104, 74; 29/237, 456; 166/77.5; 414/747, 460, 745.4, 745.5, 745.6; 285/62

[56] References Cited

U.S. PATENT DOCUMENTS

| | | | |
|---|---|---|---|
| 2,615,681 | 10/1952 | True | 166/77.5 |
| 2,780,376 | 2/1957 | Sanders | 405/170 X |
| 3,464,507 | 9/1969 | Alexander et al. | 166/77.5 X |
| 4,166,544 | 9/1979 | Cecchi et al. | 405/154 X |
| 4,218,158 | 8/1980 | Tesson | 405/154 X |
| 4,286,914 | 9/1981 | Davidson | 405/170 X |
| 4,361,435 | 12/1982 | Henry | 405/154 |
| 4,423,774 | 1/1984 | Mefford | 166/77.5 |
| 4,452,550 | 6/1984 | Hofmeester | 405/154 |
| 4,553,301 | 11/1985 | Hattori | 29/237 |
| 5,092,399 | 3/1992 | Lang | 166/77.5 |

*Primary Examiner*—Dennis L. Taylor
*Attorney, Agent, or Firm*—G. Turner Moller

[57] ABSTRACT

An apparatus for making up threaded pipeline joints includes conventional casing tongs supported on a truck for movement between a stowed position and an operative position over the side of the truck with the axis of rotation of the casing tongs being generally horizontal. A roller on the front of the truck is raised or lowered by an extensible motor controlled by the tong operator to align the pin end of the joint to be made up with the collar of the made up pipeline. The operator manipulates the support to position the casing tongs over a pipeline joint to be made up and rotates the tong dies to rotate the pipeline joint.

8 Claims, 5 Drawing Sheets

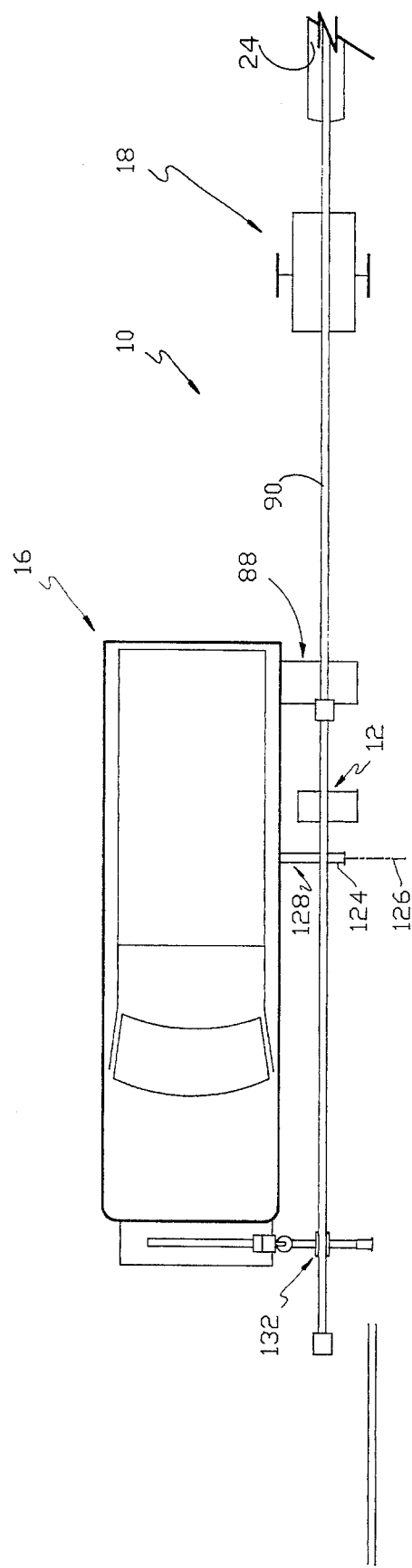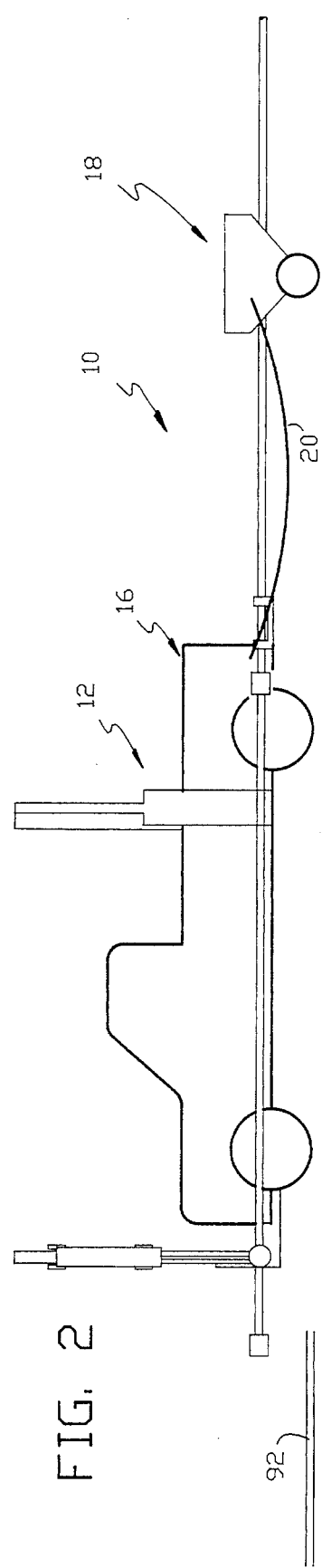

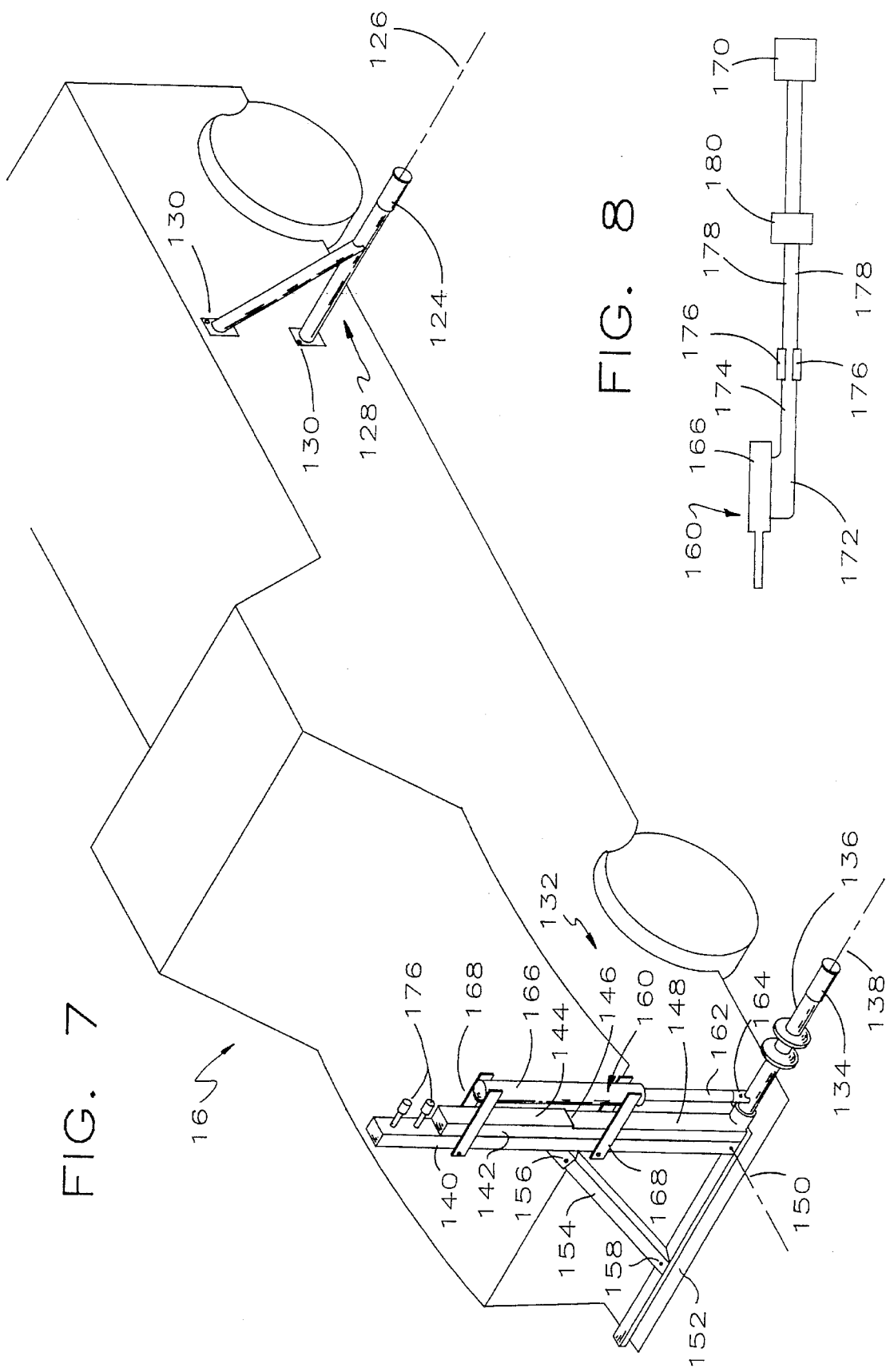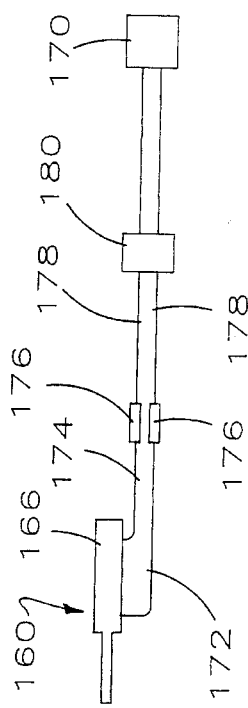

APPARATUS FOR MAKING UP THREADED PIPE JOINTS INTO A PIPELINE

This application is a continuation-in-part of application Ser. No. 08/014,851, filed Feb. 8, 1993 now U.S. Pat. No. 5,354,150.

This invention is a method and apparatus for making up threaded pipe joints and stringing the made up joints in the process of laying a pipeline.

Although most oil and gas pipelines are made up from pipe joints that are welded together, many small diameter lines gas pipelines comprise threaded joints. A typical threaded pipeline connects one or two gas wells to a larger welded pipeline and is less than a few miles long. Threaded pipe joints may either be new line pipe or used well tubing, usually 2⅜" OD or 2⅞" OD. Although most threaded pipe is doped and wrapped, it is not unusual to lay bare pipe in a ditch or on the top of the ground.

Most line pipe joints are 30–40' long and most well tubing joints are nominally 30' long. Manually making up such joints is a physically demanding chore requiring a crew of five or six. Typically, the threaded joints are strung along the pipeline right-of-way parallel to the ditch or path in which the pipeline is to be laid. Although the pipeline could theoretically be made up with the collar of one joint screwed onto the pin of the preceding joint, the pin of one joint is almost always screwed into the collar of the preceding joint. As used herein, threading one joint onto another joint includes either situation.

One crew member places a board a foot or so tall near the collar of a first joint to be screwed into. This raises the joint to a convenient working height. A pipe wrench, usually a 24" Stilson, is placed as a backup to prevent the first joint from turning. The joint to be made up is stabbed into the collar and the free end is supported by a pole having one or more V-shaped notches thereon. The joint is rotated relatively rapidly by a gripping device having an offset handle, much like an old fashioned crank handle for an automobile starter, with the pole being raised or lowered to align the two joints and allow the threads to make up without cross-threading. Several men, using pipe wrenches, continue to tighten the joint until it cannot be turned further. After the threads are made up as much as possible, the board under the preceding joint is removed and placed near the collar of the joint just made up. Working very hard and very long, a crew can make up perhaps a mile of threaded 2" pipe a day.

Disclosures of general interest are found in U.S. Pat. Nos. 1,522,408; 4,093,082; 4,345,493 and 4,362,435.

As disclosed in the above identified co-pending application, conventional casing tongs are used to perform much of the manual labor. Casing tongs include a housing and a rotatable C-shaped member providing aligned notches through which the pipe joint enters and exits, a plurality of pipe gripping devices known as dies in the C-shaped member, and a motor for turning the C-shaped member and dies. Casing tongs are usually hydraulically powered and comprise a heavy piece of equipment. Casing tongs are typically suspended in the derrick of a drilling rig when in use so the axis of rotation through the C-shaped member is vertical. Casing tongs are made by a number of manufacturers, such as B J Hughes, Inc. and Eckel Manufacturing Co.

The casing tongs are mounted vertically on a truck. The tongs are movable from a central stowed position to an operating position on one side of the truck so the axis is horizontal and parallel to the direction of travel of the truck. The preceding joint is supported in a fixture on the side Of the truck and a backup wrench is laid on the preceding joint. The joint to be made up is stabbed into the collar of the preceding joint. The tongs are moved vertically to position the C-shaped member on the more-or-less horizontal joint to be made up. The tongs are then actuated to turn the joint and thread it onto the preceding joint. When the joint is rotated to a predetermined torque, the casing tongs are stopped and then removed from the joint and the process is repeated with each successive joint. Experience with this device has shown that pipe joints of about 2"–2⅞" O.D. can be threaded together at a sustained rate of one joint per minute or about 1800'/hour.

Trailing along behind the truck is a wheeled dolly through which the made up pipeline extends. The dolly provides a support for the pipeline a half joint or so behind the truck. The dolly holds the made up pipeline in a more-or-less horizontal position and strings the made up pipeline in a predetermined path. By starting the dolly and truck at a location straddling the ditch, the dolly can be arranged to transfer the pipeline into the ditch. An implement on the dolly can be used to dope the threaded pipeline, i.e. apply a thick mastic or coating material that is of a type to retard corrosion.

In this invention, a first roller is mounted on a bracket fixed to the side of the truck for rollably supporting a pipe joint. A second roller is mounted on the front end of the truck for up-and-down movement. Movement of the second roller is done hydraulically under command of the operator. The first and second rollers cooperate to perform two quite different functions.

First, pipe joints are strung along the right-of-way by simply rolling the pipe off a truck. Thus, the pipe joints are never exactly where they are wanted and the individuals threading the pipe joints together must pick the pipe joints up and carry them to the made up end of the pipeline. Typically, the pipe joints must be carried in a forward direction, i.e. in the direction the truck is travelling. When this occurs, it is very simple for the workers to place the next joint on the rollers and allow the truck to carry the joint forwardly. Because there is a little sag in the pipe joint, there is no substantial tendency for the pipe joint to roll rearwardly when the truck is moving forwardly.

Second, the pipe joint to be made up must be raised or lowered to align the pin end with the collar of the last made up joint. In the past, this has been done by a manual pipe jack comprising a vertical support having a series of parallel legs extending away from the support at an acute angle at various distances along the support. By mounting the second roller for up-and-down movement in response to a hydraulic motor, this function can be accomplished directly by the tong operator in a simple, efficient manner thereby eliminating shouted instructions or hand signals and the common over corrections made by the worker handling the pipe jack.

It is an object of this invention to provide an improved apparatus for making up threaded pipelines.

Another object of this invention is to provide an accessory which allow a conventional set of casing tongs to be used to make up threaded pipelines in a simpler, more efficient manner.

A further object of this invention is to provide a pair of rollers on the side of a truck equipped with tongs to make up threaded pipelines.

These and other objects of this invention will become more fully apparent as this description proceeds, reference being made to the accompanying drawings and appended claims.

IN THE DRAWINGS

FIG. 1 is a top view of a pipeline laying operation in accordance with this invention;

FIG. 2 is a side elevational view of the pipeline laying operation of FIG. 1;

FIG. 7 is an isometric view of the vehicle of FIGS. 1 and 2 showing the improvements added by this invention; and FIG. 8 is a schematic view of the hydraulic circuit used with this invention.

Figure 3:
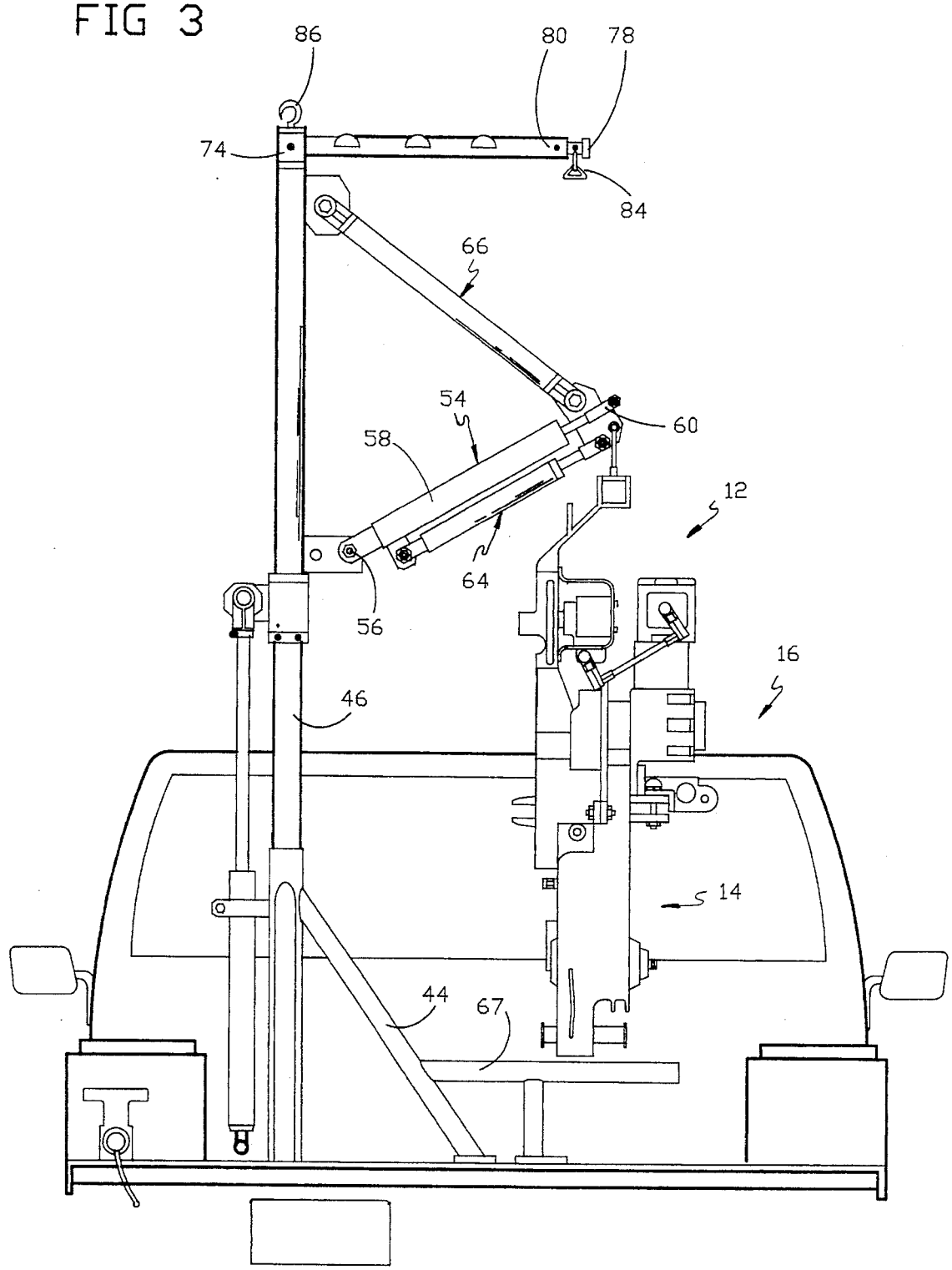
FIG. 3 is an end view of the vehicle shown in FIG. 1 with the casing tongs in a position over the vehicle ready to be stowed.
Figure 4:
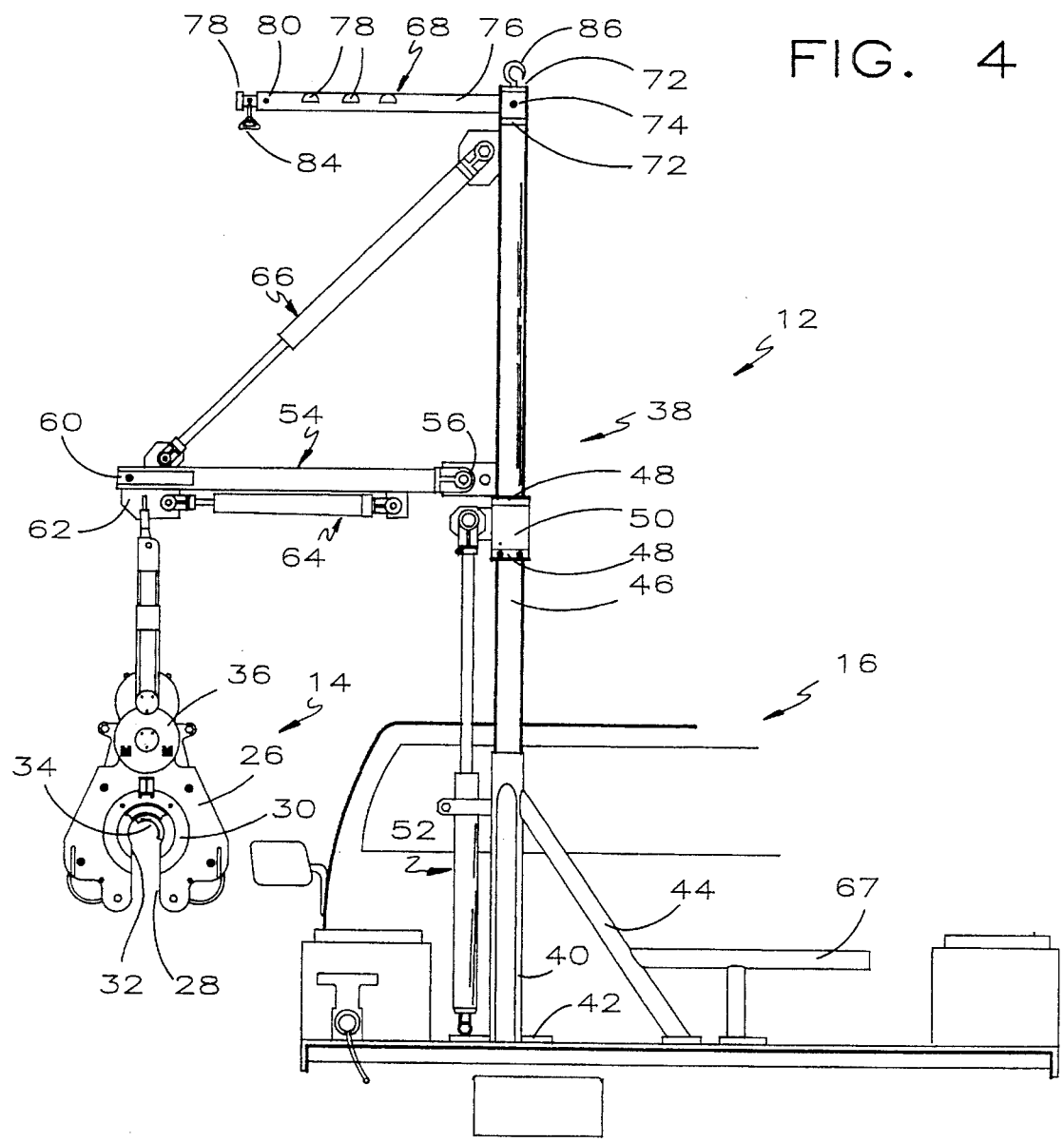
FIG. 4 is a partial end view of the vehicle shown in FIGS. 1–3 with the casing tongs over the side of the vehicle in an operative position.

Referring to FIGS. 1–4, there is illustrated a pipeline 10 being made up from a plurality of threaded joints by an apparatus 12 disclosed in the above identified application. The apparatus 12 comprises a set of conventional casing tongs 14 mounted on a truck 16 and a wheeled dolly 18 towed by the truck 16 by a flexible line 20 such as chain or cable. The made up joints of the pipeline 10 are supported on the wheeled dolly 18 tethered behind the truck 16. Thus, when the truck 16 moves down the pipeline right-of-way to make up the next joint, the dolly 18 transfers the made up joints to either the ground surface or to a ditch 24 in which the pipeline is to be buried.

The casing tongs 14 are of any suitable type customarily used to thread casing joints together when running them into a well bore extending into the earth. Conventional casing tongs 14 comprise a housing 26 having a radial slot 28 therein and a C-shaped section 30 having a slot 32 registerable with the slot 28. One or more dies 34 in the section 30 grip the exterior of the pipe joint to be turned. A motor 36, usually hydraulically driven, rotates the section 30 to close the end of the slot 28 and thereby captivate the pipe joint in the section 30. The motor 36 turns the pipe joint until the motor 36 stalls or until the operator shuts it off.

The casing tongs 14 are mounted on a support or mast 38 attached to the truck 16. The mast 38 includes a stationary tubular member 40 having a base 42 secured to the truck 16 near one side of the truck 16 in any suitable fashion, as by suitable threaded fasteners (not shown) and one or more inclined struts 44. A tubular member or mast end 46 is rotatably and telescopingly received by the member 40 and includes a pair of rigid collars 48 receiving a rotatable lubricated sleeve 50 therebetween. The member 46 is raised and lowered by a suitable extensible motor 52 attached to the sleeve 50. A telescoping arm 54 is pivotally attached to the member 46 in any suitable manner, as by the provision of a pin 56. The arm 54 includes an inboard tubular member 58 telescoping receiving an outboard member 60 having a fixture 62 thereon from which the casing tongs 14 hang. A suitable extensible motor 64 allows the arm 54 to be extended and retracted. Another suitable extensible motor 66 extends between the mast end 46 and the end of the inboard tubular member 58 for pivoting the arm 54 about the axis of the pin 56.

It will accordingly be seen that the mast 38 supports the casing tongs 14 for movement between a stowed position over the center of the truck 16 and an operative position off the side of the truck 16. The mast end 46 is easily manually rotated in the member 40 to move the tongs 14 from the stowed to the operative position. Conveniently, the tongs 14 are attached to a bar 67 in the stowed position so the tongs 14 do not swing during normal travel of the truck 16.

A second telescoping radial arm 68 is rotatably supported on the top of the mast end 46 to support an umbrella (not shown) and/or a bank of lights 70. A pair of rigid collars 72 are affixed to the mast end 46 and a rotatable lubricated sleeve 74 is positioned between the collars 72. The arm 68 accordingly includes an inboard tubular member 76 and an outboard telescoping member 78. A series of openings 80 in the members 76, 78 and a pin (not shown) secure the arm in one of a plurality of telescoping positions to place the umbrella or lights in a position to shade or illuminate the work area near the side of the truck 16. An umbrella handle receiving fixture 84 is universally mounted on the end of the member 78 to orient the umbrella in any desired direction.

It will be seen that the truck 16 may be used for different purposes because it is easy to remove the mast 38 and tongs 14 from the truck 16. The truck 16 is driven under a suitable support, such as a building rafter having an eye (not shown) to receive a hook 86 on the mast end 46. The motor 52 raises the mast end 46 to position the hook 86 in the eye. The threaded fasteners attaching the base 42 to the truck are then removed and the motor 52 is retracted to lift the mast 38 from the truck 16. The hydraulic connections to the various motors are removed and the truck 16 is then driven off.

Figure 5:
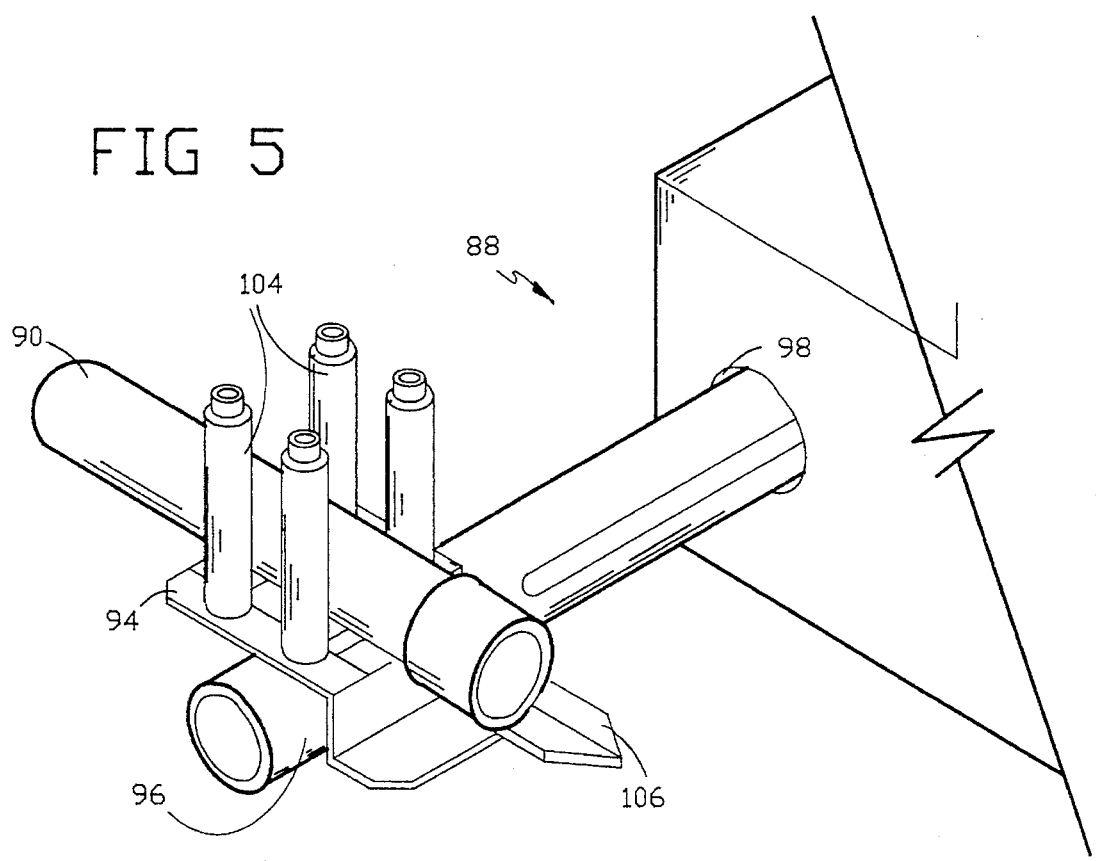
FIG. 5 is an enlarged isometric view of the fixture holding the collar of the preceding joint.

Referring to FIGS. 1 and 5, a support 88 is mounted on the truck 16 for holding the collar of a threaded pipe joint 90 into which a joint 92 will be threaded. The support 88 is preferably removably or retractably mounted on the truck 16. To this end, the support 88 includes a frame 94 mounted on a rail 96 telescopingly received in a track 98 extending across the underside of the truck 16. An extensible motor (not shown) includes a piston rod for moving the rail 96 outwardly thereby positioning the support 88 where threading is done away from the truck 16. If desired, a removable strut or tether 102 (FIG. 6) may extend from the truck 16 to the frame 76 to stabilize the support 88. The frame 94 includes two spaced pair of upright rollers 104 receiving the pipe joint 90 therebetween and an upwardly facing trough 106.

Figure 6:
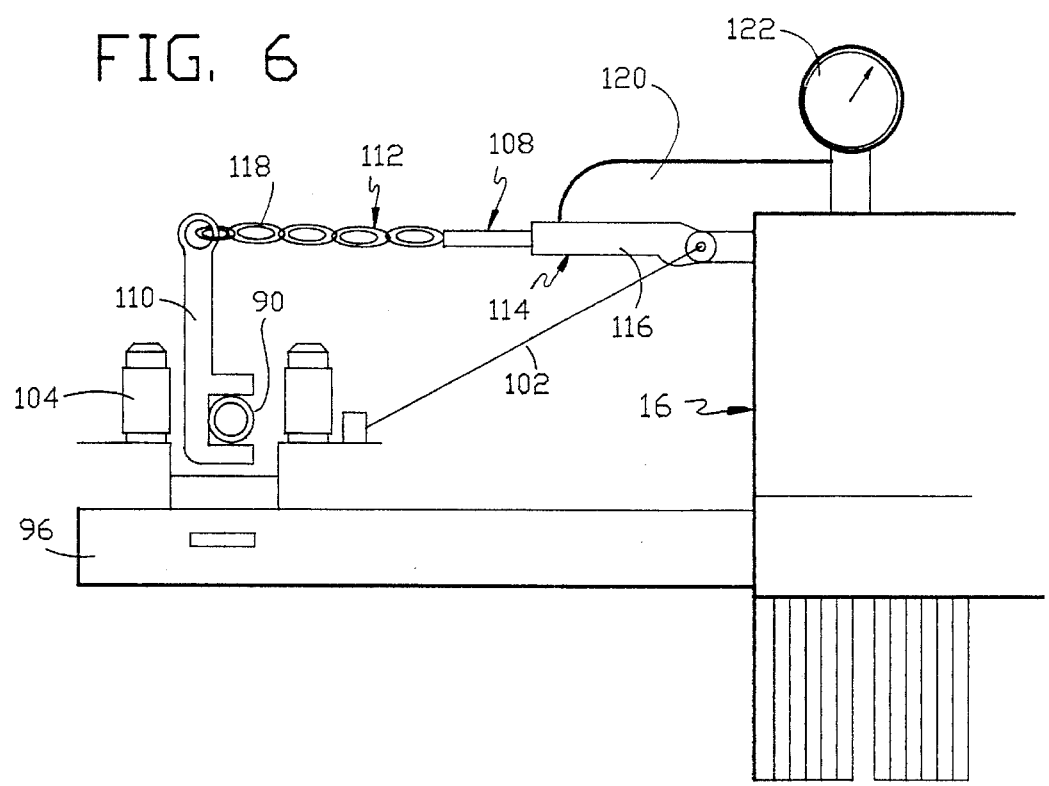
FIG. 6 is an enlarged view of the backup wrench and torque measuring device.

Referring to FIG. 6, a back up wrench assembly 108 is provided to prevent the joint 90 from rotating in response to driving the casing tongs 14. The assembly 108 includes a pipe gripping device 110, such as a pipe wrench, attached to the truck 16 through a strut 112. Preferably, the strut 112 includes a torque measuring device 114 such as a hydraulic cylinder 116 pivotally connected at one end to the truck 16 and at the other end to the wrench 110, as by use of a chain 118. The cylinder 116 includes a hose connection 120 leading to a large gauge 122 visible to the casing tongs operator. The length of the handle of the pipe wrench 110 is selected so the gauge 122 displays torque in commonly acceptable units, such as foot pounds. Those skilled in the art will recognize the apparatus 12, as heretofore described, as being disclosed in copending application Ser. No. 08/014,851.

Referring to FIG. 7, a first roller 124 is mounted for rotation about a horizontal axis 126 by a rigid bracket 128 mounted on the side of the truck 16 intermediate the front and rear ends of the truck. Preferably, the first roller 124 is located adjacent the tongs 14, in the operative position thereof, between the tongs 14 and the front of the vehicle 16 as shown in FIG. 1. The first roller 124 is forward of the casing tongs 14 and forward of the rollers 94 which are downstream of the tongs 14. The bracket 128 is fixed to the truck 16 in any suitable manner, as by removable bolts 130, so the truck 16 can travel along a road or highway in a conventional manner without special permits.

A roller assembly 132 comprises a second roller or spool 134 mounted on an cylindrical elongate arm 136 for rotation about an axis 138 and for sliding axial movement along the arm 136. The arm 136 is mounted for up-and-down movement between operative positions and is mounted for pivotal movement between a generally horizontal operative position shown in FIGS. 1 and 2 and a stowed vertical position. To these ends, the roller assembly 132 includes a first vertical support 140 which is conveniently a piece of square tubing. A second vertical support 142 comprises another piece of square tubing having a lateral face 144 cut off at 146 to expose the interior of the tubing.

A smaller piece of square tubing 148 is slidably mounted inside the support 142 and carries the arm 136. The first and second supports 140, 142 are connected together and mounted for pivotal movement about an axis 150 for movement between a vertical operative position shown in FIG. 7 and a horizontal position resting on the bumper 152 of the vehicle 16. A diagonal brace 154 extends between the bumper 152 and the support 140 for holding the assembly 132 is its vertical operating position. To this end, the brace 154 is secured by a pin 156 to the support 140 and by a pin 158 to the bumper 152.

The supports 140, 142 are secured together in any suitable manner, as by welding. A hydraulic motor 160 is mounted vertically on the support 142 and includes a piston 162 attached to the arm 136 by a pin 164 and a cylinder 166 attached to the supports 140, 142 by two sets of suitable straps 168. As shown in FIG. 8, hydraulic connections are made between the motor 160 and a source of hydraulic fluid 170 in the bed of the truck 16 in any suitable manner. Typically, high pressure hoses 172, 174 connect the cylinder 166 and a pair of fittings 176 on the support 140. Other suitable conduits 178 connect the fittings 176 with the hydraulic source 170. A valve 180 on the tongs 14 is used by the operator to raise and lower the spool 134.

Operation of the device 12 of this invention should now be apparent. After several joints of the pipeline have been made up, the pipeline 10 extends through the dolly 18 with the last made up joint still extending through the tongs 14, as shown in FIGS. 1 and 2. The truck 16 starts forward and the next joint 92 to be made up is lifted off the ground and placed in the rollers 124, 134. If the pin end of the joint 92 is short of the collar of the joint 90, one of the workers simply pushes on the joint 92 so it rolls on the rollers 124, 134 to a position near the collar it threads into. If the pin end of the joint 92 overlaps the joint 90, the truck 16 is simply driven forwardly until the pin end of the joint 92 is in approximately the right place.

The pin end of the next joint 92 to be made up is placed in the collar of the joint 90. The joint 92 is leveled by raising or lowering the spool 134 under the control of the tong operator who manipulates the valve 180 and thus retracts or extends the piston 162. Thus, the joint 92 is leveled so the threads will mesh and not cross-thread in the collar of the joint 90. The tong operator manipulates the extensible motor 52 to lower the tongs 14 so the pipe joint 92 passes through the aligned slots 28, 32. The tongs 14 are then actuated to rotate the joint 92 and thereby thread the joints 90, 92 together. By watching the gauge 122, the operator can see when to stop the tongs 14. In the alternative, the bypass (not shown) on the tongs 14 may be set to deliver the desired torque to the pipe joint 92. When the joints 90, 92 are made up, the tongs operator reverses rotation of the C-shaped member 30 thereby realigning the slots 28, 32 so the tongs 14 may be elevated off the pipe by actuating the motor 52. The truck 16 is then driven to the end of the newly made up joint so the collar lies in the support 88. The dolly 18 follows along and supports the made up pipeline joints in a more-or-less horizontal position so the next joints can be made up. As the truck moves forwardly, the next joint to be made up is lifted and placed in the rollers 124, 134 and the process is repeated.

With this invention, a four man crew is required. One drives the vehicle 16. One is the tong operator. Two lift the pipe joint to be connected onto the rollers 124, 134. Such a crew can make up about sixty joints per hour and keep it up for quite a while because no one is physically stressed.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. In an apparatus for making up threaded pipe joints into a pipeline, comprising a vehicle having a side, a front end, a rear end, a plurality of wheels and a direction of movement, a mast on the vehicle, a set of casing tongs having a movable central C-shaped member providing an axis, a pipe die for gripping a pipe joint and rotating the pipe joint about the axis, and means suspending the casing tongs from the mast with the axis being generally horizontal, spaced from the side of the vehicle in a threading position and extending in the direction of movement of the vehicle, the improvement comprising a bracket fixed on the side of the vehicle and having a first roller thereon at a location between the threading position and the front vehicle end and mounted for rotation about a fixed horizontal first axis for receiving a pipe joint; and a roller assembly including a second roller mounted for rotation about a horizontal second axis and means mounting the second roller on the side of the vehicle for up-and-down movement at a location adjacent the front vehicle end.

2. The apparatus of claim 1 wherein the means mounting the second roller comprises an elongate arm mounting the second roller for movement parallel to the second axis from a first position adjacent the vehicle to a second position away from the vehicle.

3. The apparatus of claim 2 wherein the second roller is mounted for sliding movement on the elongate arm.

4. The apparatus of claim 1 wherein the roller assembly comprises means mounting the elongate arm for pivotal movement between a first operative position where the second axis is horizontal and a second stowed position where the second axis is vertical.

5. The apparatus of claim 3 wherein the vehicle comprises a bumper and the roller assembly comprises a rigid support and wherein the means pivotally mounting the elongate arm comprises means mounting the rigid support for pivotal movement between the first operative position and a second stowed position juxtaposed and parallel to the bumper.

6. In an apparatus for making up threaded pipe joints into a pipeline, comprising a vehicle having a side, a front end, a rear end, a plurality of wheels and a direction of movement, a mast on the vehicle, a set of casing tongs having a movable central C-shaped member providing an axis, a pipe die for gripping a pipe joint and rotating the pipe joint about the axis, and means suspending the casing tongs from the mast with the axis being generally horizontal, spaced from the side of the vehicle in a threading position and extending in the direction of movement of the vehicle, the improvement comprising a roller mounted for rotation about a horizontal axis transverse to the direction of movement and means mounting the roller on the side of the vehicle for up-and-down movement at a location adjacent the front vehicle end.

7. The apparatus of claim 6 wherein the means mounting the second roller comprises an elongate arm mounting the second roller for movement parallel to the second axis from a first position adjacent the vehicle to a second position away from the vehicle.

8. The apparatus of claim 7 wherein the second roller is mounted for sliding movement on the elongate arm.

* * * * *